H. R. MILLER.
Millstone Dress.
No. 12,030. Patented Dec. 5, 1854.
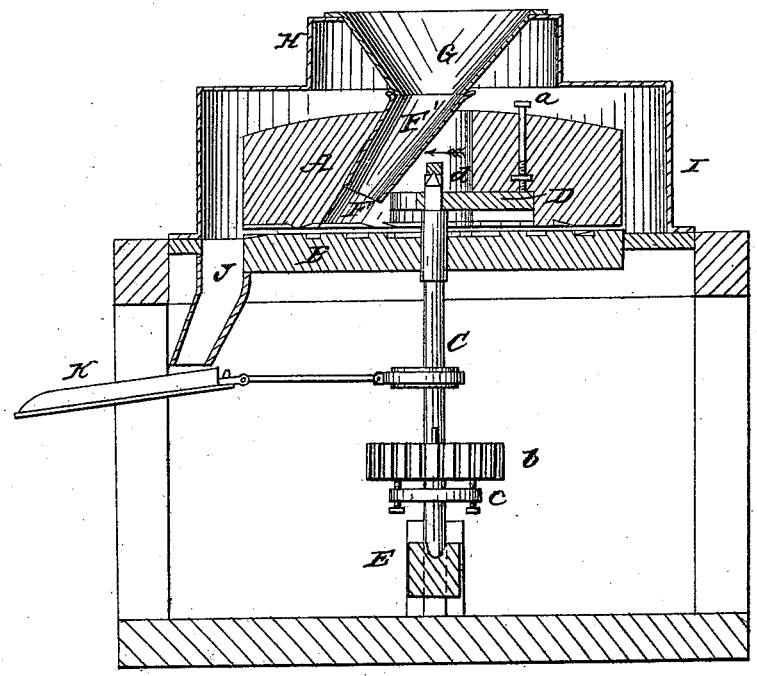
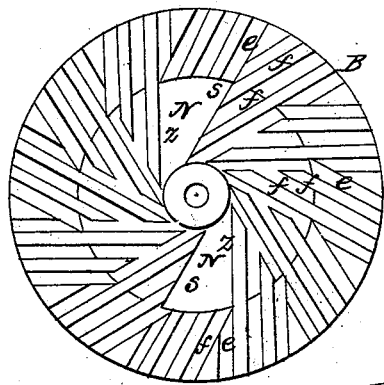
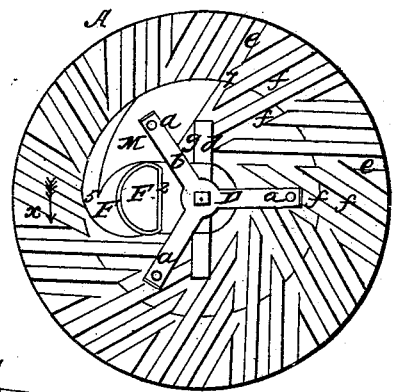
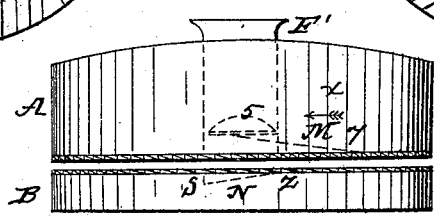

UNITED STATES PATENT OFFICE.

HENRY R. MILLER, OF LOUISVILLE, KENTUCKY.

MILL FOR SHELLING AND GRINDING CORN.

Specification of Letters Patent No. 12,030, dated December 5, 1854.

*To all whom it may concern:*

Be it known that I, HENRY R. MILLER, of the city of Louisville, in the county of Jefferson and State of Kentucky, have invented a certain new and useful Improvement in Millstone-Dress for Shelling and Grinding Corn, &c., of which the following is a full, clear, and exact description, reference being had to the accompanying drawing, which forms part of this specification, and in which—

Figure 1 represents a vertical section of the mill-stones with their revolving inclined feed tube, stationary feed hopper or funnel and other appurtenances belonging to or making up the mill; Fig. 2 represents an upper or interior face view of the lower or stationary stone; Fig. 3 an inverted plan or face view of the runner, with its revolving inclined feed tube, driver and balance rine; and Fig. 4 an outside edge view of the stones with the inclined feeding tube, in black lines, and showing, in red lines, certain peculiarities of "dress" in their relative positions toward each other.

As represented in the accompanying drawing, the upper stone or runner (A), of four and a half feet diameter, more or less, may be supported by a balance rine ($d$) on the spindle (C) and be driven by a three pronged driver (D) which should be provided with temper screws ($a$) arranged to bear on the prongs from above for the purpose of steadying the stone or preventing its vibration when shelling corn, but which may be slackened, to give vibration to the stone, when grinding family meal in the mill.

The spindle (C) has the usual trunnel head ($b$) which is raised or lowered, as required, by temper screws passing through a clip ($c$) below. Any suitable driving power to give motion to the spindle may be employed. The upper stone or runner (A) may be adjusted to its required distance from the lower stone (B), for the several purposes of shelling or grinding, by temper screws arranged to elevate or depress the bridge tree (E) on which the spindle rests.

The ordinary or central vertical eye of the upper stone (A) is enlarged or cut away obliquely at one side, from its bottom upward, to form an inclined eye or eccentric feed passage (F) into which, for a portion of its depth, is inserted, from above, an inclined feed tube ($F^1$,) that gives to the corn an oblique feed, on one side of the balance rine ($d$), and that presents a conical shape at the top, projecting above the stone, and the circumference of whose upper edge forms a concentric relationship to the run of the stone, so that, when the said inclined feed tube ($F^1$) rotates with the stone, it may travel closely around or under a central stationary feeding funnel or hopper (G) into which the ear corn to be shelled, or to be ground, is thrown, several ears at a time. In addition to the usual or any suitable dress of the stones for grinding, and consisting of main furrows ($e$) and branch furrows ($f$), of suitable "draft" or tangential run from imaginary circles concentric to the stones,— the stones are cut way or dressed otherwise, as will now be described.

The upper stone or runner (A), on its face, (see Figs. 3 and 4) is cut away at one—the rear—side of the lower extremity of the inclined feeding eye (F), for the depth of three inches, more or less, forming a curved line, 5 and 6, of thirteen inches length, more or less, sunk or cut up into the stone, of the curvature of the inclined feeding eye, it being the boundary or lower extremity, as specified, of said eye on the rear side, the stone running as indicated by the arrow ($x$). The other or advance side of the inclined feeding eye may descend to the face of the stone.

From the rear side, 5 and 6, of the inclined feeding eye, cut up into the stone as described, the stone is beveled or cut away, backward, to form a flat bosom (M) which shelves or inclines toward the face of the stone, gradually from the reduced side, 5 and 6, of the inclined feeding eye (where the bosom is of the greatest depth from the face of the stone) to a point, 7, at or near the face of the stone and at a distance of about twenty four inches, more or less, (in a circle of fifteen inches radius, more or less, from the center of the stone) from the most forward point, 5, of the reduced side of the inclined feeding eye. The third line 7 and 6, bounding the bosom, may be a straight line and formed by a continuation of one of the lips or edges of one of the main furrows ($e$), from the rear extremity, 7, of the bosom, where the bosom (M) meets, or nearly so, the face of the stone, to the sunken point, b, forming the inner extremity of the reduced side of the inclosed feeding eye. This line, 7 and 6, may form the edge of a lip or shoulder (g).

The lower stone (B)—see Figs. 2 and 4,—has, in addition to its ordinary grinding furrows (e and f), concaves or recesses (N) of suitable length, or distance from the center of the stone, for the bosom (M) of the runner (A) to sweep clean over them and so that the advance point, 5, of the bosom travels in about or over the line bounding the distance of the concaves (N) from the center of the stone. These concaves (N) are of suitable width and size to hold several ears of corn. That side (s) of the concaves which may be denominated the advance side—in view of the run of the upper stone—should be of an inch depth, more or less, to form a shoulder for the corn to lie against, and it should be made with "draft" in direction of its length, say four and a half inches draft, more or less, which would make it run in about the direction of one of the main furrows (e). The bottom of either concave (N) may be plain and shelving upward, backwardly as it were, toward the face of the stone or to within half an inch, more or less, from the face of the stone at its other or rearside (Z) which also may be made with draft.

In Fig. 4 in the drawing, one of the concaves (N) in the lower stone is represented, in red lines, in its proper situation to the upper stone when the latter runs as indicated by the arrow (X); and, in the same figure, the outer line, 5 and 7, of the bosom (M) in the upper stone is also represented in red lines, to exhibit more clearly the action of the bosom and concaves.

I have been thus minute in describing the shape, size and disposition of these several parts, in order that the mind may more readily perceive the actual effect of them in their operation, which I shall now proceed to explain.

To shell ear corn, the stones should be set at about the average thickness of a single cob apart, or say one and a half inches, more or less. This distance taken in connection with the reduction or depression of the front line, 5 and 6, of the feed outlet and the depth of the concaves will give a large or free capacity for a number of ears of corn in the concaves.

The upper stone being set in motion as indicated by the arrow (x), the corn may be thrown promiscuously into the receiving funnel (G), as many as ten, twenty or thirty, or a larger or less number of ears at a time, by shovels or otherwise. The ears, thus fed into the mill, will be turned or arrange themselves end foremost in their descent down the funnel (G) into the revolving inclined feeding tube ($F^1$), from whence they will be deposited, slide or fall, full length upon their sides, without breaking, on the lower stone (B). Thus situated, the bosom (M), by its inclined face shelving toward the face of the stone backwardly, gradually passes on to the corn and carries it forward to either concave (N), forcing it against the shoulder side (s) of the said concave. Such ears of corn as, by the feed, come parallel with the said shoulder against it, will pass immediately from the concave, between the stones, and shell; but such ears as come end foremost against the shoulder side (s) of the concave, will be turned to a like position with those that came parallel, by reason of the specified draft of the said shoulder side (s) inclining the said ears at their one end to move from the center of the stone toward the outer boundary line of the concave, while the revolving bosom (M), by its described form, set or arrangement will have an opposite effect of hooking, turning or forcing the opposite end of the ears around toward the center of the stone, thus causing the said ears to butt up against the deep shoulder (s) of the concave sideways, or lie parallel to it, when they, also, will be carried by the revolving stone, past the said concave, between the stones, and shell; and this adjustment of the ears is continually progressing, and the ears, whatever their disposition or arrangement on the lower stone by the feed, are all of them made to occupy the most favorable position for shelling, namely, the ears, for their length, caused to lie crosswise, or thereabouts, of their travel between the stones, which adjustment, the draft shoulder (s) of the stationary concave (N) and shape and arrangement of the revolving bosom (M), by the united actions of their lines and freedom of space offered between them for adjustment, smoothly and effectually accomplishes, without stoppage and without any special attention being requisite to the direction given ears in their feed into the mill. The shelling being thus effected by the rub of the stones and by the rubbing and rolling of the cobs one against the other, the corn and cob will then pass out at all sides of the stones, the verge of the runner (A) carrying them round within the casing (I) to the discharge spout (J) and from thence to a riddle (K) which may be operated by eccentric from the mill spindle and which serves to separate the corn from the cob. But, in addition to the specified adjustment of the ears for shelling, which the stationary concaves (N) and revolving bosom (M) so perfectly and rapidly effect, these parts, it should be observed, have also the effect of alike preventing the dead or inactive collection of the ears at the center which would take place were the stones merely made concave, at their center, to take in the supply of corn between them; and have also the effect of preventing the irregular or too rapid passage of the cobs in a partially worked state only, by the centrifugal action of the runner, from the stones,—the concaves (N) and bosom (M) acting in a manner as stops to start and retain the ears round the inner portion of the shelling surfaces of the stones previously to their passage to the rim or outer surfaces of the stones, and this advantage of the dress herein referred to is equally as conspicuous and great when the stones are used for grinding ear corn.

To grind ear corn, the stones (A and B) are set as closely together as may be required, and the same operation of feeding as in shelling is proceeded with, excepting that a less quantity of ears should be thrown in at a time, otherwise the operation is the same as that described in shelling; but, in grinding, the shoulder side (s) of the concaves and the back of the bosom (M) act as cutters. By raising the runner to a suitable distance from the bed stone—say three eighths of an inch, more or less—the cob will be crushed fine without breaking or bruising the corn, and this is sometimes a desirable way of preparing the corn for storing to grind afterwards either by itself or mixed with oats, barley or other grain.

In some cases I design to make the lower stone (B) with its concaves (N) the runner, and the upper stone with its bosom (M) the stationary stone, the effect being the same as already described. It is also obvious that any number of adjusting concaves (N) may be employed, and a separate feed to either concave, and additional revolving bosoms (M) on the face of the runner, of suitable shape to operate essentially as specified, may, if desired, be adopted. But in any and every such instance, substantially the same form, disposition and arrangement of the concaves (N) and bosom (M) should be observed, that is the bosom (M) should be so arranged that it extends the full length of the concave (N) and gradually bears or presses upon the ears therein as specified, and the concaves (N)—along their draft shoulder (s)—be of equal depth and the junction of the shoulder (s) and outer boundary line of the concave be such that the outer corner of the said shoulder (s) forms an abrupt stop, within or immediately under the compass or sweep of the bosom, to arrest the ears of corn from passing toward the periphery of the stones and serving, in connection with the shoulder (s) and action of the bosom (M), to adjust, without possibility of failure, every ear entering the concave to their proper position for shelling, that is parallel with a main furrow or crosswise of their after travel between the stones, and directing them to be acted upon by the interior furrowed surfaces separating the concaves instead of allowing them to pass off too rapidly, for the proper performance of the work, to the outer furrowed surfaces near the peripheries of the stones.

It is this form and arrangement of the concaves with the bosom that enables me to feed in the ears promiscuously, in large quantities, for shelling, with certainty as to their assuming—each ear—their proper specified crosswise position for shelling, without being broken, between the stones; and herein exists an important difference between my arrangement and others that have employed a like eccentric or side feed to the stones, but for only one ear at a time, for the purpose of grinding corn and cobs or corn cobs and shucks, and one of which former plans or arrangements has allowed of one ear at a time being fed down are inclined feed eye in the runner and of the ear entering endwise a concave or recess in the lower stone and of being cut in two for grinding by the edge of a metallic cutter, formed by the driver, in concert with a draft shoulder to the concave, while small ears passed uncut between the stones by room in the revolving eye permitting them to drop free of the cutters; but this arrangement has only been used for operating on one ear at a time and has not been adapted for shelling, for no crosswise adjustment of the ears for travel between the stones takes place as in mine, but some of the ears get cut in two or broken, others not, and the ears or pieces of ears enter the grinding portion of the stones with their ends pointing in various directions, unsuitable for selling or at best effecting very imperfect "shelling" a portion of the ears, or pieces of them, passing from the concaves over the draft shoulder, and others, or the one cut portion of some of the ears, passing out of an escape passage or "scollop" beyond the draft shoulder— the concave being of hopper form, that is, shelving in several directions to a deep point and the draft shoulder made of unequal depth and having no stop at its outer extremity but communicating with an open escape passage or "scollop" beyond it and beyond the travel of the feeding eye and shelving back or bosom thereof, so that while this plan might answer for grinding it could serve but very imperfectly, if at all, for shelling, and has no pretensions, nor could it be made, to operate upon more than a feed of one ear at a time, and is moreover a mere modification of the mill patented by James M. Miller in January 1843, wherein metal cutters in the bed stone take the place of a cutting draft shoulder for operating in like manner upon a feed of one ear at a time, and in which, an outer or shelving upward escape passage beyond the lower cutter is provided, the stone reduced or lower cutter made projecting to act on the ear, likewise the metal driver being made the upper cutter, and in many other respects the same similarity existing, but which mill was equally devoid of all adaptability to adjust the ears to a proper crosswise position, as specified, for shelling, though shelling might be accomplished by setting the stones to a proper distance apart, but that only imperfectly and upon such ears as happen to come in the right crosswise position for shelling, and was only capable of acting upon the ears as they were fed in one at a time. My described arrangement is the first form of mill stone dress that has admitted of a number of ears being entered simultaneously and promiscuously between the stones and of adjusting themselves rapidly and without fail into proper positions for shelling as herein fully set forth.

I do not claim as new, irrespective of their specified form and arrangement, the concaves or recesses, in the one stone, made with a draft shoulder, and acting in concert with a revolving recess or side eye; nor yet a shelving back or bosom to the said eye of the runner, irrespective of its specified form and arrangement for operation together with the concaves; nor any other of the parts herein described which are old and have been used for operating upon ear corn when fed in one ear at a time. But I do claim as new and useful, and desire to secure by letters patent,—

The construction and arrangement herein shown and described of the circumscribed or inclosed concaves (N), having their draft shoulders (s) of equal depth or thereabouts and made with an abrupt stop at their outer corner by the junction of the outer boundary line of the concave with the shoulder (s); when combined and operating together with the adjusting bosom (M) in the other stone and extending as specified to cover or act over the whole surface of the concave; whereby the ears of corn, fed into between the stones promiscuously and several at a time, are prevented from passing out of the concave otherwise than over the draft shoulder (s), and are gradually turned, borne or passed by the bosom (M) against the draft shoulder to an equal extent of contact therewith, throughout their length, for the better adjustment of the several ears into a proper crosswise position for "shelling" and travel between the inner furrowed surfaces of the stones, as herein set forth.

In testimony whereof, I have hereunto subscribed my name.

H. R. MILLER.

Witnesses:
WM. M. SMITH,
A. GREGORY.